March 28, 1939.  J. B. NELSON  2,152,081
CAMERA LATCH
Filed July 31, 1937
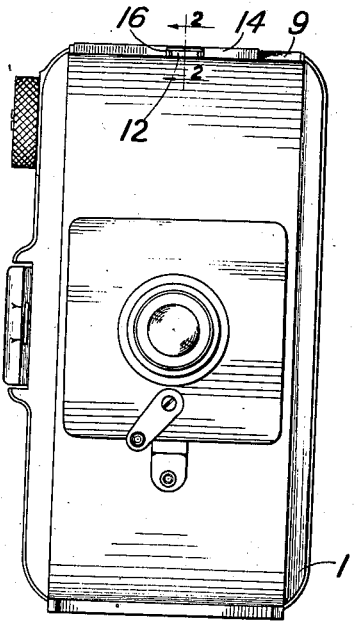
FIG. 1
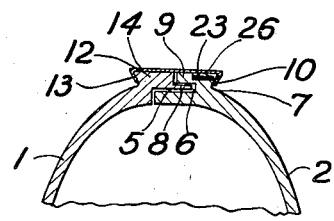
FIG. 2
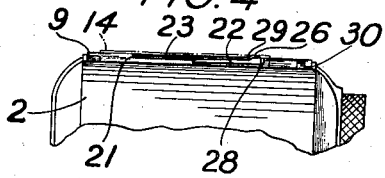
FIG. 4
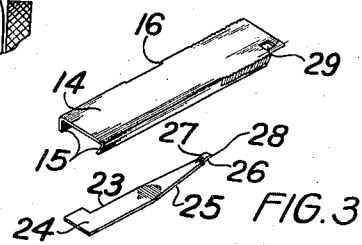
FIG. 3
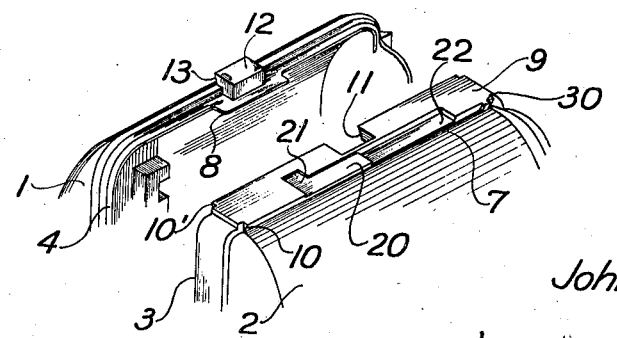
John B. Nelson
INVENTOR.
BY
ATTORNEYS.

Patented Mar. 28, 1939

2,152,081

UNITED STATES PATENT OFFICE 2,152,081

CAMERA LATCH

John B. Nelson, Rochester, N. Y., assignor to Eastman Kodak Company, Rochester, N. Y., a corporation of New Jersey Application July 31, 1937, Serial No. 156,763

5 Claims. (Cl. 292—147)

The present invention relates to photography, and more particularly to a latch for separable photographic cameras.

One object of the present invention is the provision of a camera latch particularly adapted for use on cameras made of molded composition. Another object of the invention is to provide a camera latch, which is simple in construction, and requires a minimum number of parts. And, still another object is to provide a latch which is simple to assemble and requires no screws or other attaching means. Another object of the invention is to provide a camera latch wherein the slidable latch member is retained on one camera part by a catch member which is adapted to frictionally retain the latch member in a locking position, but positively prevent its accidental removal from the camera part. And still another object is to provide a latch of the type described wherein the slidable latch member serves to hold the catch member in assembled position, and the catch member serves to hold the latch member in assembled position. A further object is to provide a latch of the type described which can be easily disassembled if the need should arise. And yet another object of the invention is to provide a latch which, when attached to a camera, appears to be an integral part thereof and does not detract from its appearance.

Briefly, the latch comprises a spring catch member which is positioned in a recess in the edge of one camera part, and which is held in said recess by the latch member which is slidably mounted on the camera by virtue of flanges thereon engaging undercut portions of the camera part. The catch member has a cam portion normally extending into the path of the latch member, but this cam portion is so arranged that the latch member can be slid onto the camera part there-over into its assembled position. After being slid onto the camera body, the latch member is prevented from accidental removal by virtue of the fact that the cam portion on the catch member snaps into an aperture in the latch member to retain it in its locked position. If the need for disassembling the latch should present itself, it is only necessary to press the cam portion from the aperture described with any sharp pointed instrument, after which the latch can be slid off the camera part.

The novel features that I consider characteristic of my invention are set forth with particularity in the appended claims. The invention itself, however, both as to its organization and its method of operation, together with additional objects and advantages thereof, will best be understood from the following description of specific embodiments when read in conjunction with the accompanying drawing in which:

Fig. 1 is a front elevation of a camera equipped with a latch constructed in accordance with my invention, and showing the latch in its locking position, Fig. 2 is a section taken on line 2—2 of Fig. 1, Fig. 3 is a fragmentary perspective view showing the latch parts in separated position, and showing the interengaging parts of the camera, and Fig. 4 is a fragmentary front elevation of the camera, and showing the latch in its locking position; the latch member being shown dotted to clearly illustrate the engagement of the catch member with the aperture in the latch member in this position of the latch.

Like reference characters refer to corresponding parts throughout the drawing.

I have illustrated my camera latch on a simple form of camera which may consist of a body portion 1 having a back 2 which may be separated from the body portion along the line 3, such cameras being of well-known construction.

In order to hold the camera back 2 to the camera body 1, I have provided a latch the elements of which are shown in a separated position in Fig. 3.

It should be noted that the camera body 1 is provided with a flange 4 which extends around the opening in the camera body, and which extends into a corresponding groove 5 on the camera back to form a light-tight joint. The groove 5 is somewhat deepened over an area 6, see Fig. 2, in the top wall of the camera back 2 to receive an extended flange 8 on the camera back, so as to form a light-tight joint beneath the cooperating latch elements.

The top wall 7 of the camera back 2 is provided with a rail 9 which has undercut edges 10 and 10' for the purpose hereinafter described. An opening 11 is provided in the inner edge 10' of the rail 9 to receive the lug 12 projecting from the top of the camera back 1 when the two camera parts are brought together. The rear edge 13 of the lug 12 is undercut so that, when the camera parts are in closed position, this edge of the lug will form a continuation of the undercut edge 10' of the rail 9.

The latch member 14 is channel shaped to conform to the outer surface of the rail 9 and is adapted to be slid onto the rail from the left looking at Fig. 3, whereupon the downwardly turned flanges 15 thereon will engage the undercut edges 10 and 10' to prevent removal of the latch from the rail except through a sliding motion. One of the downwardly extending flanges is provided with an aperture 16 which, when brought into alignment with the opening 11 in the rail 9 allows the lug 12 to enter or leave an opening as the case may be.

The face of the rail 9 is provided with a recess 20 having an L-shaped portion 21 of one depth, and a portion 22 of another depth, see Fig. 3. The spring catch 23 has a flat L-shaped portion 24 which is adapted to fit into the L-shaped portion 21 of the recess 20 whereby the spring catch is prevented from moving longitudinally of the rail 9. The L-shaped portion 24 of the catch 23 is of such a thickness that, when seated in the recess 21, the top of the catch will be flush with the face of the rail. The catch 23 has an upturned spring portion 25 which extends over the portion 22 of the recess 20, and which normally extends above the face of the rail 9. The end of the upturned portion 25 takes the form of a cam portion 26 having a cam surface 27 and a square end 28.

After the spring catch 23 is properly seated in the recess 20, the latch member 14 is slid onto the rail 9 from the left-hand edge, looking at Fig. 3. In moving onto the rail, the latch member 14 will slide over the L-shaped portion 24 of the catch 23, and upon engaging the cam surface 27 of the cam portion 26 will cam this portion down into the deeper portion 22 of the recess 20. When the latch member 14 has been slid far enough onto the rail 9, the cam portion 26 will snap into the aperture 29 in the top of the latch member, whereupon the square end 28 of the cam portion will engage the edge of the aperture to positively prevent the latch member from being slid in reverse and off of the rail, see Fig. 4. As will be obvious by referring to Fig. 4, the aperture 29 in the latch 14 and the cam portion 26 of the catch 23 are of such dimensions that the cam portion does not snap completely through the aperture, but extends thereinto only far enough to allow the square end 28 of the cam portion to engage the wall of the aperture. When the latch 14 is in this position on the rail 9, see Fig. 4, the aperture 16 of the flange 15 thereof is out of alignment with the opening 11 in the rail 9 and the lug 12 is prevented from leaving the opening 11. This position constitutes the locking position of the latch 14, and it will be understood that the latch is frictionally retained in this position by virtue of the cam portion 26 extending through the aperture 29 in the latch 14.

To unlock the latch, the latch member is moved on toward the right of the rail until it comes against the stop 30 extending from the edge thereof. When the latch is in this position on the rail 9, the aperture 16 of the flange 15 thereof is in alignment with the opening 11 in the end of the rail and the lug 12 on the camera body 1 can be removed from the opening. This constitutes the unlocking position of the latch 14. As the latch member is moved from its locking position to its unlocking position it engages the cam surface 27 of the cam portion 26 and cams the upturned portion 25 of the catch 23 down into the recess 22. The cam portion 26 will frictionally engage the under side of the latch 14 at all times when the latch is not in its complete locking position, and will prevent the latch from sliding uncontrollably from one position to another along the rail.

The operation of such a latch is extremely simple. With the camera back 2 latched on the camera body 1, see Fig. 4, the latch 14 is moved to the right, looking at Figs. 3 and 4, until it abuts the stop 30 on the rail in which position the aperture 16 will lie over the lug 12. The parts of the camera may then be separated. To latch the two camera parts together, the lug 12 is swung through the aperture 16 into the opening 11 and the latch 14 is moved along the rail until the cam portion 26 and the catch 23 snaps into the aperture 29 in which position the lug 12 is confined in the opening 11 by the flange 15 of the latch 14. The cooperation of the aperture 29 and the cam portion 26 in addition to serving as a positive stop for preventing the slide from being removed from the rail, also serves to frictionally hold the latch 14 in its locking position so that the latch cannot be accidentally moved to its open position.

If the need should ever arise for disassembling the latch, it can be easily accomplished by merely depressing the cam portion 26 of the catch 23 from the aperture 16 by means of any sharp-pointed instrument, and sliding the latch member to the left over said cam portion and off the end of the rail 9.

From the foregoing description taken in connection with the accompanying drawing, it will be apparent that I have produced an extremely simple camera latch which is particularly adapted for easy assembling, and disassembling, and which is highly efficient in operation.

Although I have shown and described certain specific embodiments of my invention, I am fully aware that many modifications thereof are possible. My invention, therefore, is not to be restricted except insofar as is necessitated by the prior art and by the spirit of the appended claims.

Having thus described my invention, what I declare is new and desire to secure by Letters Patent of the United States is:

1. In a latch for cameras comprising two relatively movable parts, one part including an undercut rail having an opening forming a break in one edge of the rail and having an L-shaped recess in the top thereof, one portion of which recess extends longitudinally of said rail, the other part including a lug adapted to fit into said opening, the combination with a latch member slidably mounted on the rail and including downwardly extending flanges covering the undercut edges of the rail, one downwardly extending flange having an aperture for uncovering the opening in the rail, a stop on the rail for limiting the movement of the latch member in one direction along the rail, of means for positively limiting the movement of the latch member along the rail in the other direction and for frictionally retaining the same in a set position, said means including an L-shaped spring catch resting in said L-shaped recess in the top of the rail, that portion of said catch engaging the portion of said L-shaped recess extending transversely of said rail being of a size to snugly fit into the same whereby movement of said catch longitudinally of said rail is prevented, a cam portion on one end of said catch normally frictionally engaging the under side of the latch member, and adapted to snap into a rectangular aperture in the latch member whereby its end engages one end of the aperture in the latch member whereby its end engages one end of the aperture in the top of the latch member to positively prevent movement of the latch member in the other direction along the rail, and its cam portion engages the opposite side of the aperture to frictionally hold the latch member in its set position, that portion of the recess below the latch engaging portion of the spring catch being cut away to permit of the spring member being manually depressed to free the cam portion of the spring catch from the aperture in the latch member.

2. In a latch for cameras comprising two relatively movable parts, one part including a rail having an opening in one longitudinal edge thereof, and an L-shaped recess in the face thereof, one portion of which recess extends longitudinally of said rail, said other part including a lug adapted to fit into said opening, the combination with a latch member slidably mounted on said rail, and including downwardly extending flanges covering the edges of said rail, one of said downwardly extending flanges provided with an aperture for uncovering said opening in the rail, of an L-shaped spring catch situated in and closely fitting said L-shaped recess whereby it is held against movement longitudinally of said rail, and having a free end adapted to engage said latch member in a manner to frictionally resist movement of the same, and means on the free end of said catch and on said latch member cooperating to permit the latch member to be slid onto one end of said rail and over the catch for the purpose of assembly, and to positively prevent said latch member from being slid off the same end of said rail.

3. In a latch for cameras comprising two relatively movable parts, one part including a rail having an opening in one longitudinal edge thereof, and an L-shaped recess in the face thereof, one portion of which recess extends longitudinally of said rail, said other part including a lug adapted to fit into said opening, the combination with a latch member slidably mounted on said rail, and including downwardly extending flanges covering the edges of said rail, one of said downwardly extending flanges provided with an aperture for uncovering said opening in the rail, a stop on the rail to limit the movement of the latch member in one direction along the rail, of an L-shaped spring catch situated in said L-shaped recess in the rail, that portion of said catch engaging the portion of the recess extending transversely of the rail being of a size to snugly fit into the same whereby movement of said catch member longitudinally of said rail is prevented, a free end on said catch member engaging the underside of said latch member to frictionally retard its movement along said rail over a given path, and adapted to snap into an opening in said latch member to frictionally retain the later in a set position and at the same time positively prevent its removal from the rail.

4. In a latch for cameras comprising two relatively movable parts, one part including a rail having an opening in one longitudinal edge thereof, and an L-shaped recess in the face thereof, one portion of which recess extends longitudinally of said rail, said other part including a lug adapted to fit into said opening, the combination with a latch member slidably mounted on said rail, and including downwardly extending flanges covering the edges of said rail, one of said downwardly extending flanges provided with an aperture for uncovering said opening in the rail, a stop on the rail to limit the movement of the latch member in one direction along the rail, of means for positively limiting the movement of the latch member along the rail in the other direction and for frictionally retaining the same in a set position, said means including an L-shaped spring catch situated in said L-shaped recess in the rail, that portion of said catch member engaging the portion of the L-shaped recess extending transversely of the rail being of a size to snugly fit into the same whereby movement of said catch member longitudinally of said rail is prevented, and a free end of said catch member including a cam portion engaging the underside of said latch member to frictionally retard its movement along said rail over a given path, said cam portion adapted to snap into and out of an opening in the top of said latch member when said latch member is moved to a given position along said rail.

5. In a latch for cameras comprising two relatively movable parts, one part including a rail having an opening in one longitudinal edge thereof, and having a recess in the top thereof, one portion of which recess extends substantially transversely of said rail, and another portion of which recess extends substantially longitudinally of said rail, said other part including a lug adapted to fit into said opening, the combination with a latch member slidably mounted on said rail, and including downwardly extending flanges covering the edges of said rail, one of said downwardly extending flanges provided with an aperture for uncovering said opening in the rail, of a spring catch complementary in shape to said recess in the rail situated in said recess, and including a portion adapted to fit snugly into that portion of said recess extending substantially transversely of said rail whereby said catch is held against movement longitudinally of said rail, said catch including a free end adapted to engage said latch member in a manner to frictionally resist movement of the same, and means on the free end of said catch and on said latch member cooperating to permit the latch member to be slid onto said rail and over said catch for the purpose of assembly, and to positively prevent said latch member from being slid off the same end of said rail.

JOHN B. NELSON.

CERTIFICATE OF CORRECTION.

Patent No. 2,152,081. March 28, 1939.

JOHN B. NELSON.

It is hereby certified that error appears in the printed specification of the above numbered patent requiring correction as follows: Page 1, second column, line 7, for the word "locking" read unlocking; line 35, after "back" insert the numeral 2; and line 49, for "position" read relation; page 2, second column, lines 74 and 75, claim 1, strike out the words "whereby its end engages one end of the aperture in the latch"; page 3, first column, line 1, same claim, strike out the word "member"; and that the said Letters Patent should be read with this correction therein that the same may conform to the record of the case in the Patent Office.

Signed and sealed this 6th day of June, A. D. 1939.

Henry Van Arsdale (Seal) Acting Commissioner of Patents.